United States Patent
Kaji et al.

(10) Patent No.: US 12,298,578 B2
(45) Date of Patent: *May 13, 2025

(54) OPTICAL FIBER CABLE PRODUCTION METHOD, AND OPTICAL FIBER CABLE

(71) Applicant: Fujikura Ltd., Tokyo (JP)

(72) Inventors: Tomoaki Kaji, Sakura (JP); Akira Namazue, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,439

(22) Filed: Oct. 27, 2023

(65) Prior Publication Data

US 2024/0053562 A1 Feb. 15, 2024

Related U.S. Application Data (63) Continuation of application No. 17/642,378, filed as application No. PCT/JP2020/030567 on Aug. 11, 2020, now Pat. No. 11,835,778.

(30) Foreign Application Priority Data

Oct. 9, 2019 (JP) .................................. 2019-185963

(51) Int. Cl.
*G02B 6/44* (2006.01)
*B29C 48/00* (2019.01)
(Continued)

(52) U.S. Cl.
CPC ........ *G02B 6/4432* (2013.01); *B29C 48/0021* (2019.02); *B29C 48/09* (2019.02);
(Continued)

(58) Field of Classification Search
CPC .................................................... G02B 6/4432
See application file for complete search history.

(56) References Cited

U.S. PATENT DOCUMENTS

| | | | |
|---|---|---|---|
| 3,087,007 A | 4/1963 | Jachimowicz | |
| 4,151,365 A | 4/1979 | Hacker | |

(Continued)

FOREIGN PATENT DOCUMENTS

| | | | |
|---|---|---|---|
| CN | 102636854 A | 8/2012 | |
| CN | 206877719 U | 1/2018 | |

(Continued)

OTHER PUBLICATIONS

International Search Report issued in corresponding International Application No. PCT/JP2020/030567 mailed Nov. 2, 2020 (3 pages).

(Continued)

*Primary Examiner* — Charlie Y Peng
(74) *Attorney, Agent, or Firm* — Osha Bergman Watanabe & Burton LLP (57) ABSTRACT

An optical fiber cable includes: a core including optical fibers; a reinforcing wrap that surrounds the core; and a sheath that accommodates the core and the reinforcing wrap. The reinforcing wrap includes an overlapping portion. A first end portion of the reinforcing wrap overlaps a second end portion of the reinforcing wrap at a portion of the reinforcing wrap in a circumferential direction of the optical fiber cable in a cross-sectional view.

9 Claims, 10 Drawing Sheets

(51) Int. Cl.
  *B29C 48/09* (2019.01)
  *B29C 48/154* (2019.01)
  *B29K 105/00* (2006.01)
  *B29L 11/00* (2006.01)

(52) U.S. Cl.
  CPC .... *B29C 48/154* (2019.02); *B29K 2105/0026* (2013.01); *B29K 2105/0097* (2013.01); *B29L 2011/0075* (2013.01)

(56) References Cited

U.S. PATENT DOCUMENTS

| | | | |
|---|---|---|---|
| 4,328,394 A | | 5/1982 | Aloisio, Jr. et al. |
| 4,439,632 A | * | 3/1984 | Aloisio, Jr. ............ H01B 7/18 174/107 |
| 5,095,176 A | | 3/1992 | Harbrecht et al. |
| 5,218,658 A | | 6/1993 | Macleod |
| 5,930,431 A | | 7/1999 | Lail et al. |
| 11,237,346 B2 | * | 2/2022 | Kuramitsu ........... G02B 6/4431 |
| 2015/0043874 A1 | | 2/2015 | Sandate Aguilar et al. |
| 2015/0355430 A1 | | 12/2015 | Clampitt et al. |
| 2015/0378119 A1 | | 12/2015 | Granger et al. |

FOREIGN PATENT DOCUMENTS

| | | |
|---|---|---|
| CN | 105556367 B | 8/2019 |
| JP | S63-259912 A | 10/1988 |
| JP | H11-337783 A | 12/1999 |
| JP | 2013-101175 A | 5/2013 |
| JP | 2019-113619 A | 7/2019 |

OTHER PUBLICATIONS

Non-Final Office Action issued in corresponding U.S. Appl. No. 17/642,378 mailed Mar. 16, 2023 (9 pages).

* cited by examiner

OPTICAL FIBER CABLE PRODUCTION METHOD, AND OPTICAL FIBER CABLE

CROSS-REFERENCE TO RELATED APPLICATIONS

This is a continuation application of U.S. patent application Ser. No. 17/642,378, filed on Mar. 11, 2022, which is a U.S. National Stage application of International Application No. PCT/JP2020/030567, filed Aug. 11, 2020, which claims priority to Japanese Patent Application No. 2019-185963, filed on Oct. 9, 2019. The contents of these applications are incorporated by reference in their entirety.

TECHNICAL FIELD

The present invention relates to an optical fiber cable production method and an optical fiber cable.

BACKGROUND

Patent Document 1 discloses an optical cable that includes an optical fiber core wire, a reinforcing member disposed to surround the optical fiber core wire, a filler with which a space between the optical fiber core wire and the reinforcing member is filled, and a sheath that covers the outside of the reinforcing member.

In a production method of such an optical cable, first, a strip-shaped material used as the reinforcing member is prepared, and an adhesive is applied onto both end portions of the strip-shaped material. Then, the optical fiber core wire is disposed above the strip-shaped material, and filling with the filler is performed on the strip-shaped material and the optical fiber core wire. Then, by causing the strip-shaped material and the optical fiber core wire to pass through a former, both the end portions of the strip-shaped material overlap each other to form the reinforcing member. Then, the reinforcing member is introduced into an extruder and is caused to pass through the extruder. In this manner, the reinforcing member is coated with a resin to form the sheath.

PATENT LITERATURE

[Patent Document 1]
Japanese Unexamined Patent Application, First Publication No. H11-337783

In the optical cable in Patent Document 1, since the overlapping portions of the reinforcing member are joined by the adhesive, there is a possibility that there is a portion having a weak adhesive force in a longitudinal direction of the optical cable. For example, at the portion having a weak adhesive force, the overlapping portion may open and stress may concentrate on the sheath covering that portion when the optical cable is bent. Accordingly, the sheath may crack.

One or more embodiments of the present invention provide an optical fiber cable production method and an optical fiber cable capable of suppressing an occurrence of cracking of a sheath.

SUMMARY

According to one or more embodiments of the present invention, an optical fiber cable production method includes feeding a core including a plurality of optical fibers, winding a reinforcing member around the core to form an overlapping portion at which end portions of the reinforcing member overlap each other at a portion of the reinforcing member in a circumferential direction, and performing extrusion molding of a sheath on an outside of the reinforcing member. In the performing extrusion molding, a resin forming the sheath is inserted into at least a portion of the overlapping portion.

According to one or more embodiments of the present invention, an optical fiber cable includes a core including a plurality of optical fibers, a reinforcing member configured to surround the core, and a sheath configured to accommodate the core and the reinforcing member. The reinforcing member has an overlapping portion in which end portions overlap each other at a portion of the reinforcing member in a circumferential direction, and a resin forming the sheath is inserted into at least a portion of the overlapping portion.

According to one or more embodiments of the present invention, it is possible to suppress an occurrence of cracking of the sheath.

DETAILED DESCRIPTION

First Embodiment

Hereinafter, a configuration of an optical fiber cable according to a first embodiment will be described with reference to FIGS. 1 to 8.

Figure 1:
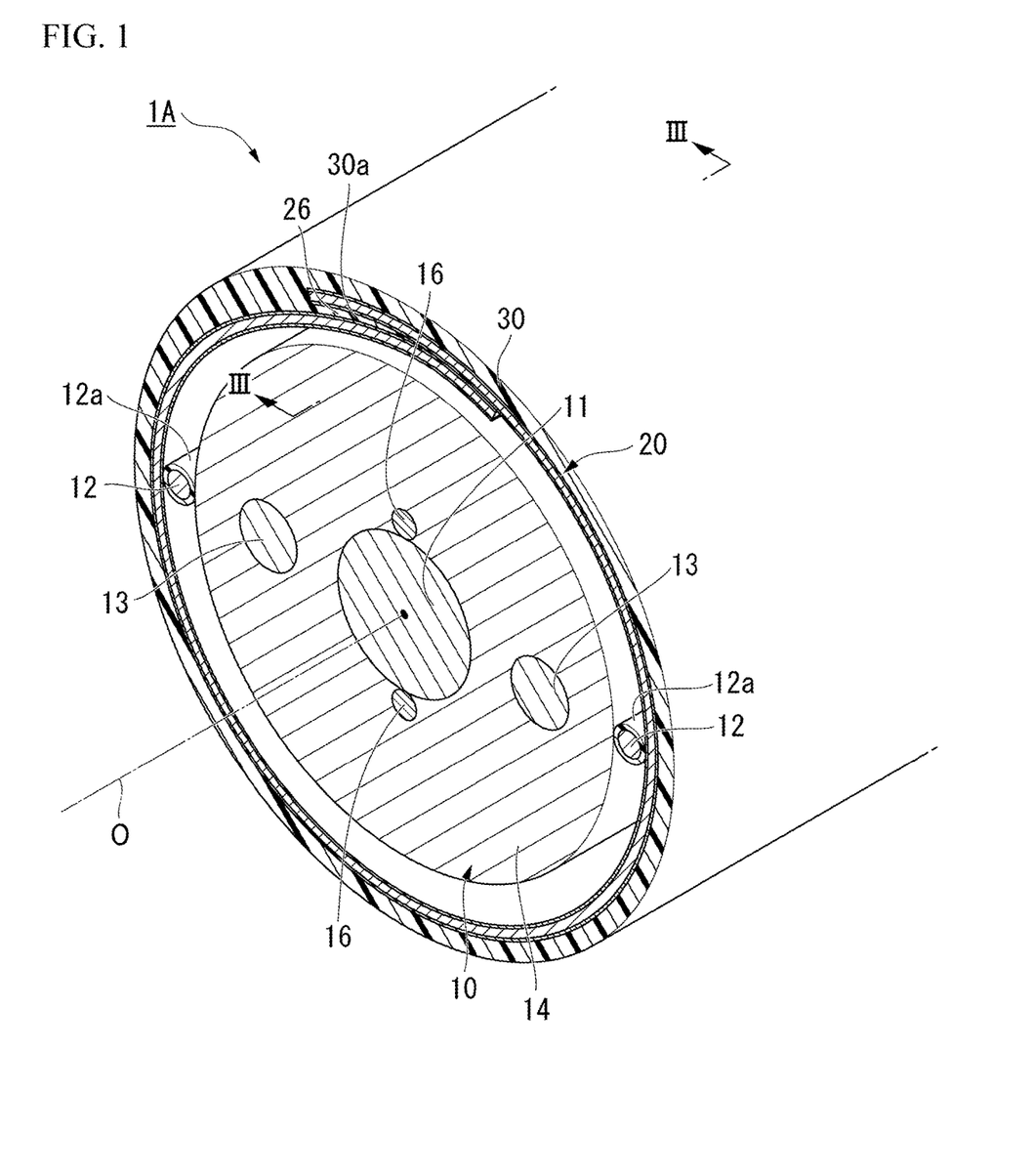
FIG. 1 is a perspective view of an optical fiber cable according to a first embodiment.

As shown in FIG. 1, an optical fiber cable 1A includes an inner layer cable 10 including an optical fiber, a reinforcing unit (reinforcing member, reinforcing wrap) 20, an outer sheath 30, and a pair of first ripcords 12.

(Direction Definition)

Here, in the present embodiment, the longitudinal direction of the inner layer cable 10 is simply referred to as a longitudinal direction, and the central axis of the inner layer cable 10 is referred to as a central axis O. A section perpendicular to the central axis O is referred to as a cross section. In a cross-sectional view, a direction that intersects the central axis O is referred to as a radial direction, and a direction that turns around the central axis O is referred to as a circumferential direction.

The inner layer cable 10 includes a core 11 including a plurality of optical fibers, a pair of second ripcords 16, a pair of tensile strength bodies (tension members) 13, and an inner sheath 14. The inner layer cable 10 does not have to include the second ripcords 16.

The core 11 extends in the longitudinal direction. The core 11 is configured by assembling a plurality of optical fibers. As the optical fiber constituting the core 11, an optical fiber wire, an optical fiber core wire, an optical fiber tape core wire, or the like can be used. For example, the plurality of optical fibers constituting the core 11 may be bound by a binding material in a bundled state to form an optical fiber unit. The plurality of optical fibers are covered with a presser roll or a water absorbing tape.

Figure 2:
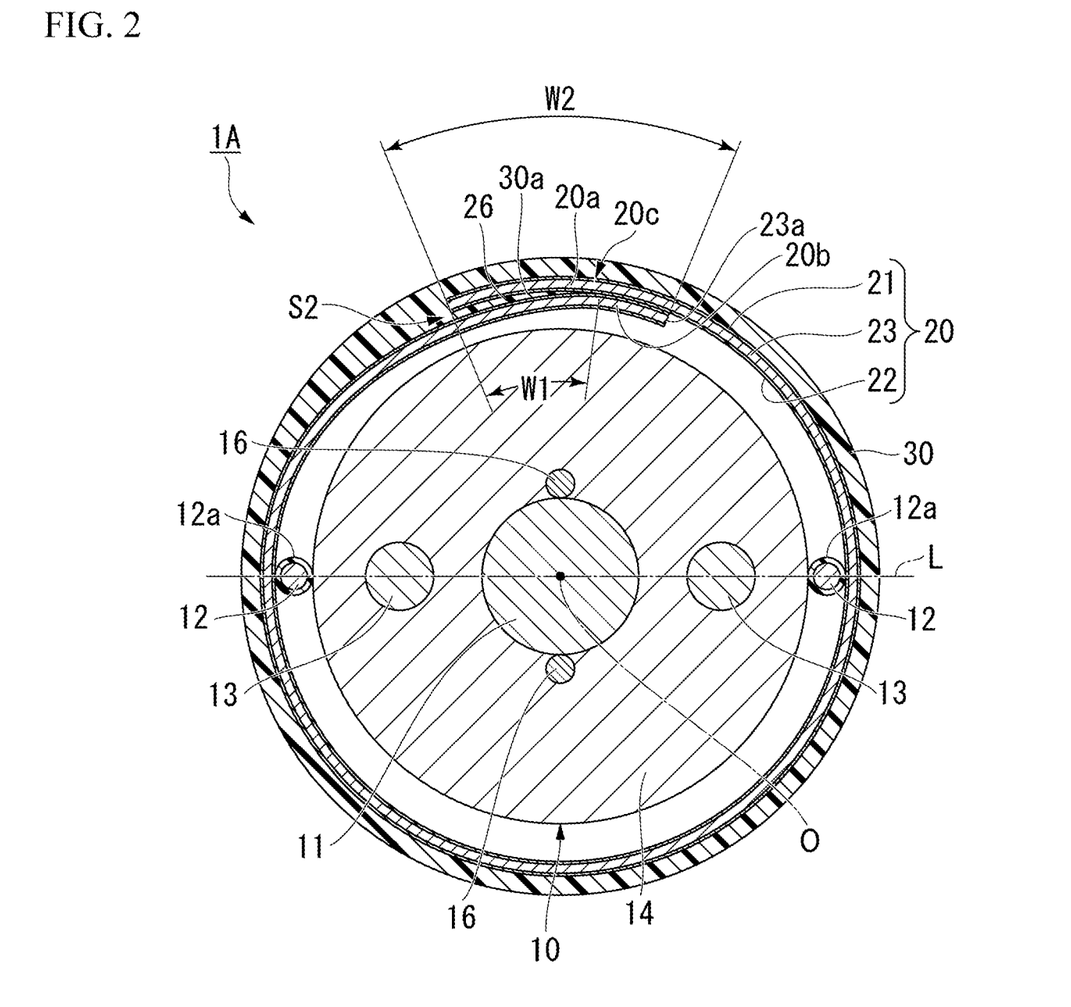
FIG. 2 is a cross-sectional view of the optical fiber cable according to the first embodiment.

As shown in FIG. 2, the pair of second ripcords 16 are buried in the inner sheath 14 to sandwich the core 11 in the radial direction in a cross-sectional view. The pair of second ripcords 16 extend in the longitudinal direction. The pair of second ripcords 16 are located on a straight line passing through the central axis O perpendicular to a neutral line L described later, in a cross-sectional view. The pair of second ripcords 16 are in contact with the outer peripheral surface of the core 11. As the material of the second ripcord 16, a string made of synthetic fibers such as polyester and aramid, a columnar rod made of PP or nylon, or the like can be used.

The pair of tensile strength bodies 13 are buried in the inner sheath 14 to sandwich the core 11 in the radial direction in a cross-sectional view. Each tensile strength body 13 extends in the longitudinal direction. Each tensile strength body 13 may be disposed to be parallel to the core 11 in the longitudinal direction, or may be disposed spirally around the core 11.

The tensile strength body 13 has a function of protecting the optical fiber of the core 11 from the tension acting on the optical fiber cable 1A. The material of the tensile strength body 13 is, for example, a metal wire (steel wire or the like), a tensile strength fiber (aramid fiber or the like), FRP, or the like. The tensile strength body 13 may be a single wire, or may be obtained by bundling or twisting a plurality of strands together.

A straight line connecting the centers of the pair of tensile strength bodies 13 in a cross-sectional view is referred to as the neutral line L. When the optical fiber cable 1A is bent in a direction (vertical direction in FIG. 2) perpendicular to the neutral line L, the expansion and contraction of the tensile strength body 13 become smaller than that when the optical fiber cable 1A is bent in the other directions. Thus, it is relatively easy to bend the optical fiber cable 1A in the direction perpendicular to the neutral line L.

The inner layer cable 10 may include three or more tensile strength bodies 13. When three or more tensile strength bodies 13 are disposed at equal intervals in the circumferential direction, the directivity of bending the inner layer cable 10 becomes small, and thus it is possible to more easily handle the optical fiber cable 1A.

As shown in FIG. 2, the inner sheath 14 collectively covers the core 11, the pair of tensile strength bodies 13, and the pair of second ripcords 16. As the material of the inner sheath 14, resin such as polyethylene (PE) or polyvinyl chloride (PVC) can be used. The inner sheath 14 is formed in a cylindrical shape extending in the longitudinal direction. The inner sheath 14 is formed by extrusion molding or the like.

The outer sheath 30 accommodates the inner layer cable 10, the pair of first ripcords 12, and the reinforcing unit 20.

The reinforcing unit 20 extends in the longitudinal direction and is formed in a cylindrical shape surrounding the inner layer cable 10. The reinforcing unit 20 includes a first adhesive film (adhesive layer) 21, a second adhesive film 22, and a reinforcing sheet 23.

As the material of the reinforcing sheet 23, metal such as iron, stainless steel, copper, or a copper alloy can be used. The material of the reinforcing sheet 23 can be changed as appropriate. The reinforcing sheet 23 may be formed, for example, in a tape shape, and may be provided so that a length direction is aligned with the longitudinal direction of the inner layer cable 10. The thickness of the reinforcing sheet 23 is, for example, about 0.1 to 0.3 mm. By setting the thickness of the reinforcing sheet 23 within this range, it is possible to prevent the damage of the optical fiber of the core 11 by the feeding damage of animals, and to facilitate an operation of tearing the reinforcing sheet 23 by the first ripcord 12.

In the present embodiment, the reinforcing unit 20 will be described by using an example of a configuration including the first adhesive film 21 and the second adhesive film 22. The reinforcing unit 20 may include at least the first adhesive film 21. When the second adhesive film 22 is provided in addition to the first adhesive film 21, it is possible to further strengthen a film adhesive force at an overlapping portion 20c (described later) and suppress rust on the reinforcing sheet 23.

The reinforcing unit 20 surrounds the inner layer cable 10 over the entire circumference and is overlapped at a portion of the reinforcing member in the circumferential direction. In the present specification, a portion in which a first end portion 20a and a second end portion 20b in the circumferential direction of the reinforcing unit 20 overlap each other is referred to as an overlapping portion 20c. In the overlapping portion 20c, the first end portion 20a and the second end portion 20b face each other in the radial direction.

In the present embodiment, in a cross-sectional view, the entirety of the overlapping portion 20c and the tensile strength body 13 are disposed at different positions in the circumferential direction.

The first adhesive film 21 is bonded to the surface of the reinforcing sheet 23, that faces the outer sheath 30. The second adhesive film 22 is bonded to the surface of the reinforcing sheet 23, that faces the inner layer cable 10. As the adhesive used for the first adhesive film 21 and the second adhesive film 22, for example, a heat-curable type adhesive or a hot melt type adhesive can be used. The material of the adhesive may be changed as appropriate. The first adhesive film 21 has a function of fixing the outer sheath 30 to the reinforcing sheet 23. The second adhesive film 22 may have a function of fixing the first ripcord 12 to the reinforcing sheet 23 together with coating 12a of the first ripcord 12, which will be described later. A portion of the overlapping portion 20c located between the reinforcing sheets 23 in the first adhesive film 21 and the second adhesive film 22 has a function of fixing the end portions of the reinforcing sheets 23 to each other at the overlapping portion 20c.

Figure 3:
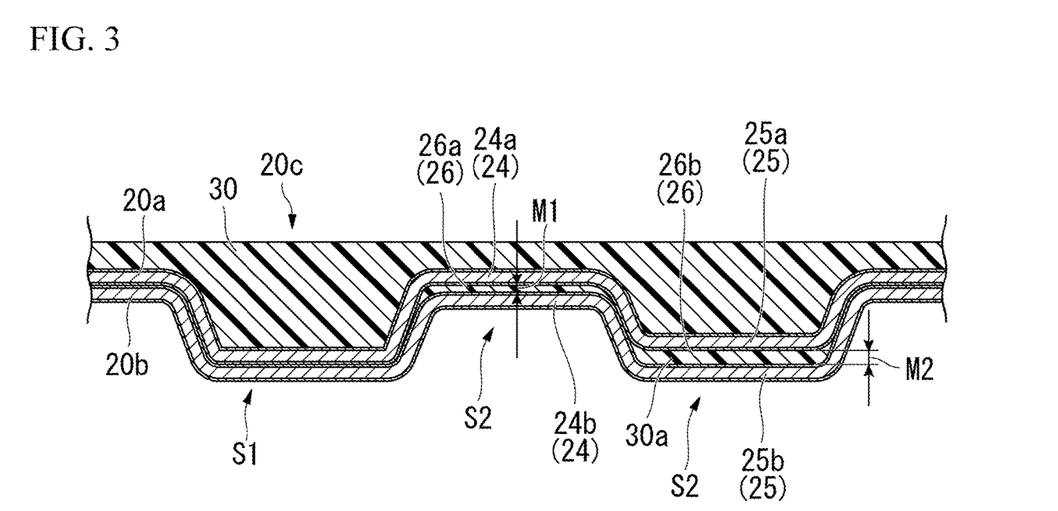
FIG. 3 is a sectional view taken along line III-III in FIG. 1.

As shown in FIG. 3, the reinforcing unit 20 has a corrugated shape in which peak portions 24 that are protrusions outward in the radial direction and valley portions 25 that are protrusions inward in the radial direction are alternately formed along the longitudinal direction. In the overlapping portion 20c, a peak portion 24a of the first end portion 20a and a peak portion 24b of the second end portion 20b are disposed to face each other in the radial direction, and a valley portion 25a of the first end portion 20a and a valley portion 25b of the second end portion 20b are disposed to face each other in the radial direction.

In the overlapping portion 20c, the adhering state between the first end portion 20a and the second end portion 20b by the first adhesive film 21 and the second adhesive film 22 may not be uniform in the longitudinal direction. In the present specification, a state in which the first end portion 20a and the second end portion 20b are adhered to each other by the adhesive films 21 and 22 with a predetermined film adhesive force or larger is referred to as a state S1, and a state in which the first end portion 20a and the second end portion 20b are adhered to each other with a film adhesive force smaller than the predetermined film adhesive force is referred to as a state S2. In the state S2, for example, as shown in FIG. 2, a gap 26 is formed between the first end portion 20a and the second end portion 20b. The "predetermined film adhesive force" is a force as large as the first end portion 20a and the second end portion 20b are sufficiently adhered to each other by the adhesive films 21 and 22.

In the example in FIG. 3, a portion in the longitudinal direction is in the state S1, and the other portion is in the state S2. In the state S2, a gap 26a is formed between the peak portion 24a and the peak portion 24b, and a gap 26b is formed between the valley portion 25a and the valley portion 25b. The gap 26 may or may not be continuously formed in the longitudinal direction.

Here, in the present embodiment, as shown in FIG. 2, the resin 30a forming the outer sheath 30 is inserted into the gap 26 between the first end portion 20a and the second end portion 20b. That is, the outer sheath 30 and the resin 30a inserted into the gap 26 are integrally formed. As shown in FIG. 3, the resin 30a is inserted into the gap 26a between the first end portion 20a and the second end portion 20b in the peak portion 24, and the resin 30a is inserted into the gap 26b between the first end portion 20a and the second end portion 20b in the valley portion 25.

The dimension M2 of the resin 30a between the valley portions 25a and 25b in the radial direction is thicker than the dimension M1 of the resin 30a between the peak portions 24a and 24b in the radial direction.

Here, in the present embodiment, as shown in FIG. 2, when the width of the resin 30a inserted into the gap 26 in the circumferential direction is defined as W1 and the width of the overlapping portion 20c in the circumferential direction is defined as W2, a ratio W1/W2 of the resin width W1 to the overlap width W2 is equal to or more than 0.10. The value of W1/W2 is not particularly limited. By setting value of W1/W2 to be equal to or more than 0.10, it is possible to reliably adhere the first end portion 20a and the second end portion 20b to each other with the resin 30a.

As shown in FIG. 1, the outer sheath 30 is formed in a cylindrical shape extending in the longitudinal direction, and is inserted into the gap 26 as described above. As the material of the outer sheath 30, resin such as polyethylene (PE) or polyvinyl chloride (PVC) can be used. In the present embodiment, the outer sheath 30 is formed of flame-retardant resin ((EVA: Ethylene Vinyl Acetate), elastomer, and the like) containing a large amount of flame-retardant filler.

As shown in FIG. 1, the pair of first ripcords 12 extend in the longitudinal direction and are disposed between the inner layer cable 10 and the reinforcing unit 20. The pair of first ripcords 12 are in contact with the outer peripheral surface of the inner sheath 14. The pair of first ripcords 12 are in contact with the inner peripheral surface of the reinforcing unit 20, that is, the inner surface of the second adhesive film 22. As shown in FIG. 2, the pair of first ripcords 12 are located on the neutral line L in the cross-sectional view. As the first ripcord 12, a string obtained by twisting synthetic fibers such as polyester and aramid can be used. The optical fiber cable 1A does not have to include the first ripcord 12.

The coating 12a formed of adhesive resin is provided around the first ripcord 12. As the material of the coating 12a, a polyolefin-based material such as polyethylene or a copolymer thereof (for example, EVA), thermoplastic resin such as polyester-based resin, polyurethane-based resin, or polyamide-based resin, resin having adhesiveness such as thermosetting resin, synthetic rubber, or the like can be used. As the coating 12a, the above materials can be singly used. In order to adjust the adhesiveness, the tackiness, the temperature at the time of heat fusion, and the like, two or more of the above materials may be mixed or modified to introduce a functional group.

When the reinforcing unit 20 does not include the second adhesive film 22, resin containing a functional group may be used as the material of the coating 12a in order to secure the adhesiveness between the first ripcord 12 and the reinforcing sheet 23. The coating 12a can be formed by applying the adhesive resin onto the outer periphery of the first ripcord 12.

The first ripcord 12 is used in a work of tearing the reinforcing sheet 23 and the outer sheath 30 (simply referred to as a tearing work below). The first ripcord 12 is required to have mechanical strength (for example, tensile strength) sufficient to tear the reinforcing sheet 23 and the outer sheath 30.

As shown in FIG. 2, the first ripcord 12 is disposed at a position different from the position of the overlapping portion 20c of the reinforcing unit 20 in the circumferential direction in the cross-sectional view. Here, when the first ripcord 12 is disposed at a position at which the first ripcord overlaps the overlapping portion 20c of the reinforcing unit 20 in the circumferential direction, an operation of tearing the reinforcing unit 20 by the first ripcord 12 becomes difficult, since the thickness of the overlapping portion 20c in the radial direction is thick. In the present embodiment, since the first ripcord 12 is disposed at the position different from the position of the overlapping portion 20c of the reinforcing unit 20 in the circumferential direction, it is possible to improve the operability of tearing the reinforcing unit 20.

Further, in the present embodiment, a side edge 23a in the overlapping portion 20c and the first ripcord 12 are disposed at different positions in the circumferential direction in the cross-sectional view. Thus, when the reinforcing unit 20 is torn, it is possible to suppress the work of tearing the reinforcing unit 20 from being hindered and suppress the first ripcord 12 from being cut off at the side edge 23a of the overlapping portion 20c.

(Production Method)

Next, a production method of the optical fiber cable 1A in the present embodiment will be described.

First, the inner layer cable 10 is prepared. The inner layer cable 10 is obtained, for example, by feeding out the core 11 and the pair of tensile strength bodies 13 and then covering the core 11 and the pair of tensile strength bodies 13 with the inner sheath 14 (feeding). The inner layer cable 10 may be prepared in a separate process, or may be prepared in tandem with the subsequent process.

Then, the reinforcing unit 20 in which the first adhesive film 21 and the second adhesive film 22 are bonded to the flat plate-shaped reinforcing sheet 23 is prepared. Then, the flat plate-shaped reinforcing unit 20 is processed to form the peak portion 24 and the valley portion 25. The order of the steps of bonding the first adhesive film 21 and the second adhesive film 22 to the reinforcing sheet 23 is not limited to this, and may be changed as appropriate.

Then, two first ripcords 12 are vertically attached to the reinforcing unit 20. At this time, the two first ripcords 12 are disposed substantially parallel to each other, and a predetermined distance is provided between the first ripcords 12.

Then, the reinforcing unit 20 is wound around the inner layer cable 10 to form an overlapping portion 20c in which the first end portion 20a and the second end portion 20b of the reinforcing unit 20 overlap each other at a portion of the reinforcing member in the circumferential direction (winding). Thus, the first end portion 20a and the second end portion 20b are temporarily fixed to each other by the first adhesive film 21 and the second adhesive film 22, and thus the reinforcing unit 20 has a cylindrical shape that surrounds the inner layer cable 10 and extends in the longitudinal direction. Further, in the winding, the peak portions 24 of the first end portion 20a and the second end portion 20b are caused to face each other in the radial direction, and the valley portions 25 of the first end portion 20a and the second end portion 20b are caused to face each other in the radial direction.

Then, the reinforcing unit 20 is pressed so that the first end portion 20a and the second end portion 20b are brought close to each other by rollers (rotating body, not shown) disposed to face each other.

At this time, the overlapping portion 20c of the reinforcing unit 20 has a state S1 in which bonding is performed with a predetermined film adhesive force or larger, and a state S2 in which bonding is performed with a film adhesive force that does not satisfy the predetermined film adhesive force.

Figure 4:
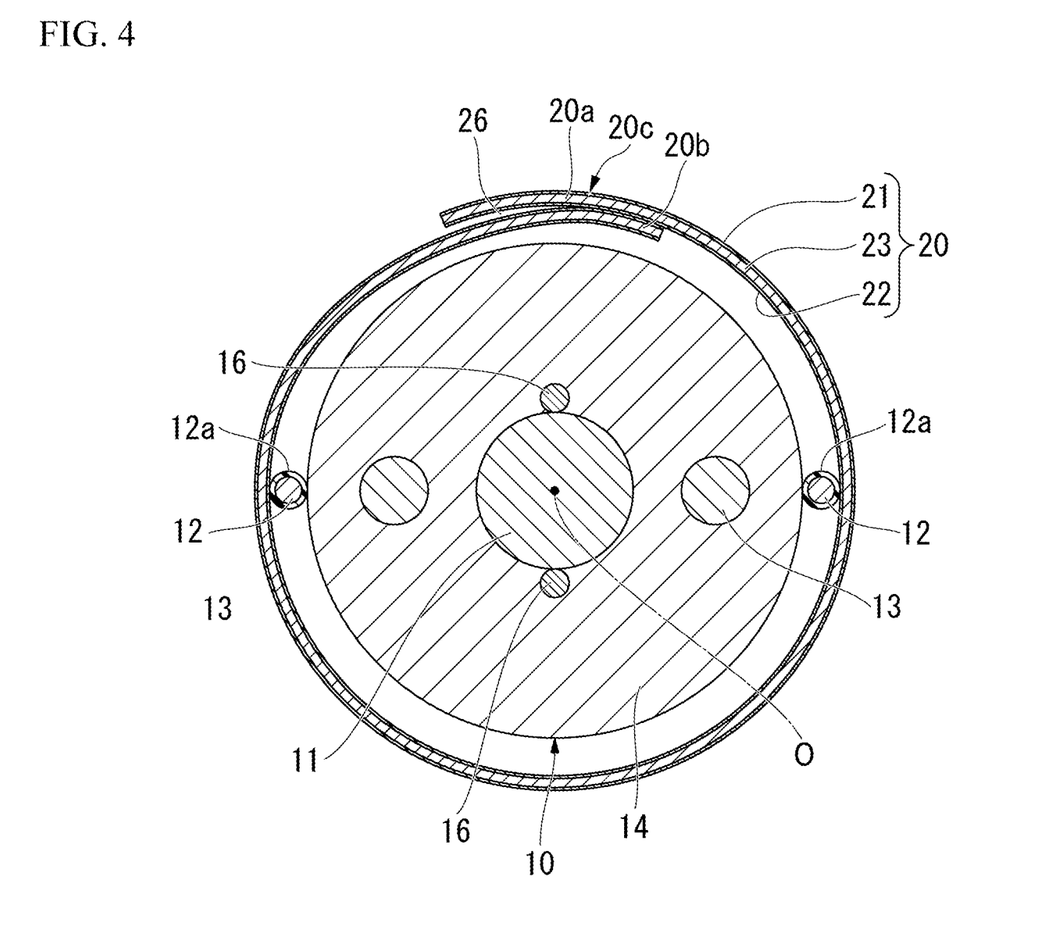
FIG. 4 is a cross-sectional view of the optical fiber cable in FIG. 1 before covering an outer sheath.
Figure 5:
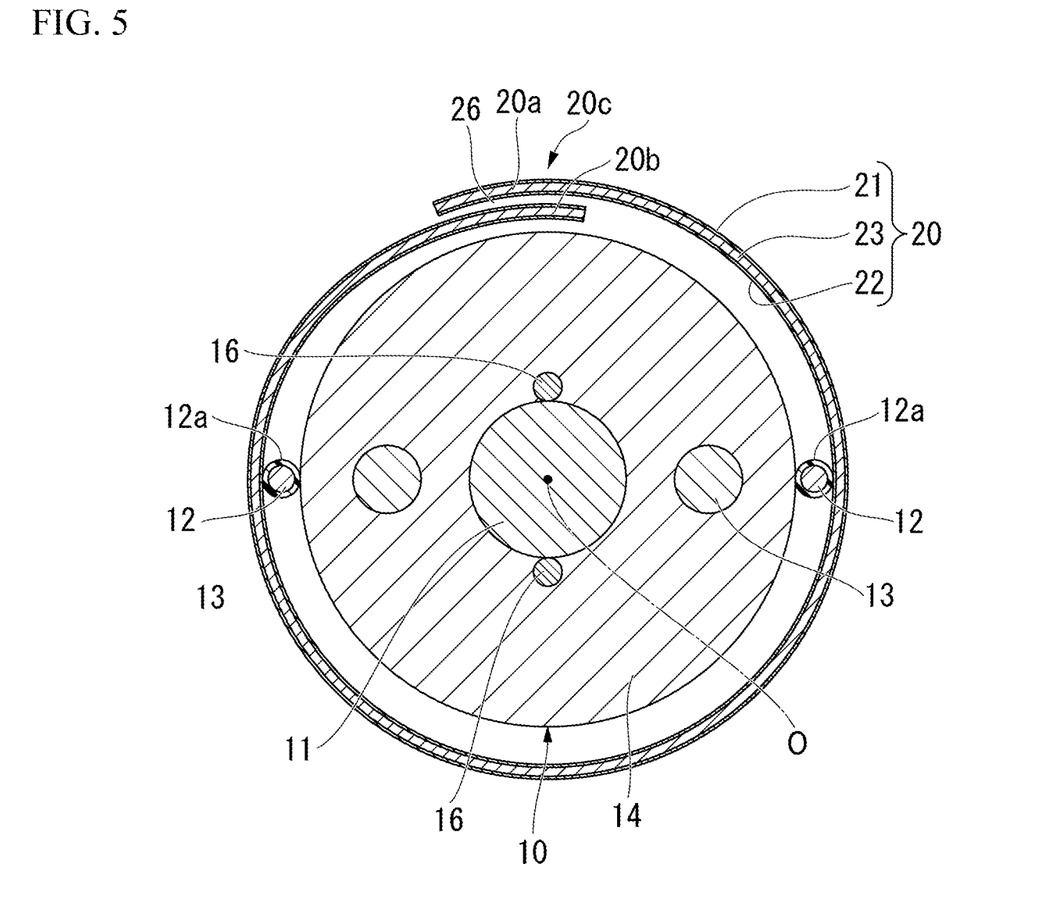
FIG. 5 is a cross-sectional view of the optical fiber cable in FIG. 1 before covering the outer sheath.

The state S2 that does not satisfy the predetermined film adhesive force includes, for example, a state S2a shown in FIG. 4 and a state S2b shown in FIG. 5. In the state S2a shown in FIG. 4, the first end portion 20a and the second end portion 20b are partially in contact with each other to form a gap 26. In the state S2b shown in FIG. 5, the first end portion 20a and the second end portion 20b are not in contact with each other, and a gap 26 is formed in the entirety in the circumferential direction of the overlapping portion 20c.

Figure 6:
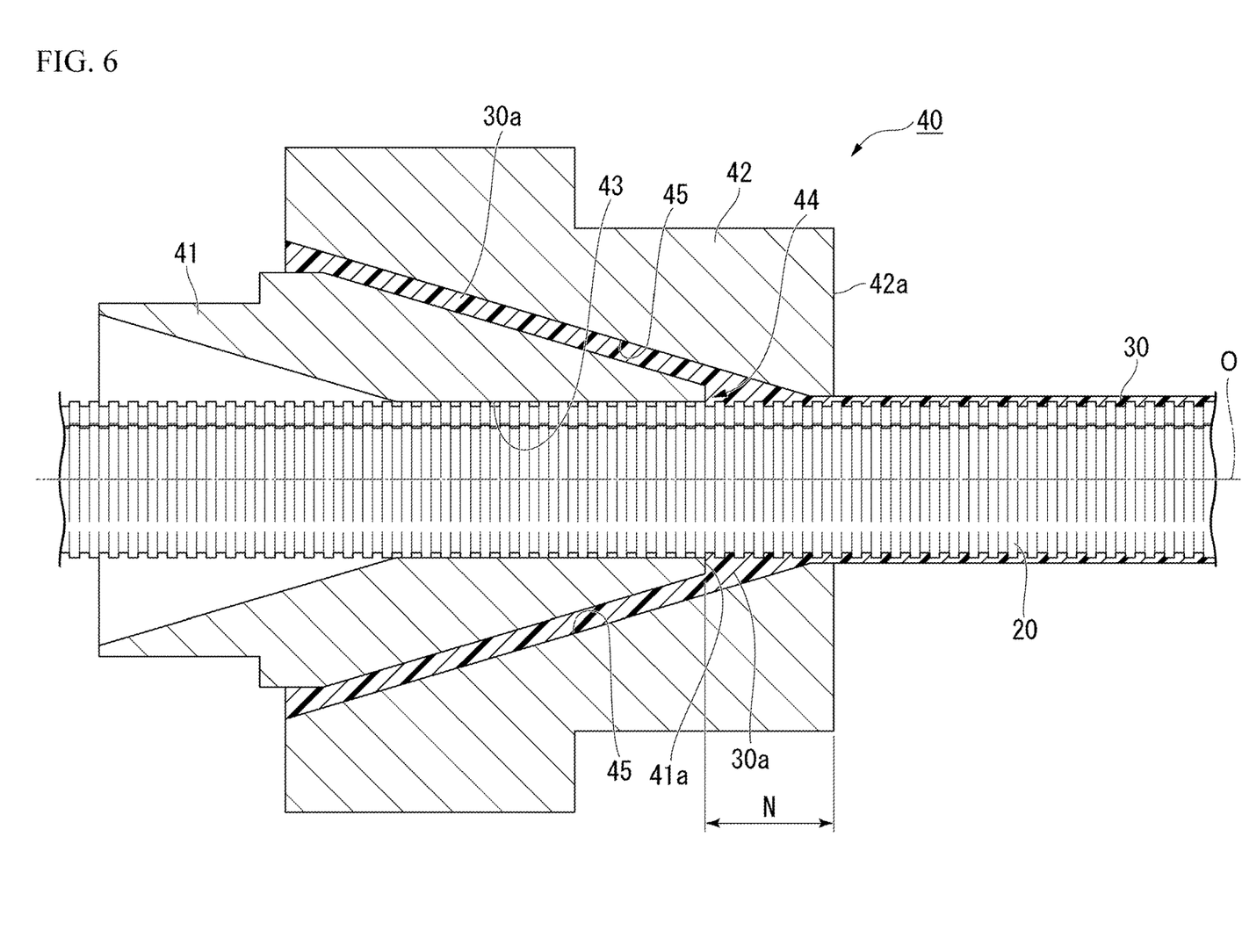
FIG. 6 is a diagram showing an optical fiber cable production method according to the first embodiment.

Then, the outer sheath 30 is extrusion-molded by using an extrusion covering device 40 as shown in FIG. 6 so as to cover the reinforcing unit 20 (performing extrusion molding).

The extrusion covering device 40 includes a nipple 41 through which the inner layer cable 10 surrounded by the reinforcing unit 20 is inserted, and a die 42 provided substantially coaxially on the outside of the nipple 41. The inner layer cable 10 surrounded by the reinforcing unit 20 is inserted into an insertion hole 43 of the nipple 41, and flame-retardant resin 30a melted from a resin flow path 45 is extruded and applied onto the outer periphery of the reinforcing unit 20 coming out from an outlet 44 of the nipple 41.

The resin pressure in the performing extrusion molding is pressure obtained in advance so that the ratio W1/W2 of the resin width W1 to the overlapping width W2 is equal to or more than 0.10. The resin pressure can be adjusted, for example, by changing a distance N between a tip 41a of the nipple 41 and a tip 42a of the die 42. Thus, the distance N that causes W1/W2 to be equal to or more than 0.10 is calculated in advance by an experiment and the like before the start of production. The resin pressure may be adjusted by other means. Other means include, for example, the shape of the die 42 and the nipple 41, the inner diameter of the resin flow path 45, the amount of the resin 30a discharged from the extrusion covering device 40, the setting of the temperature, and the like.

In the present embodiment, the reinforcing unit 20 is covered with the resin 30a in a state where the nipple 41 and the die 42 are installed so that the distance between the nipple 41 and the die 42 is the distance N calculated in advance. As described above, the inner layer cable 10 and the reinforcing unit 20 are accommodated in the outer sheath 30 by extrusion-molding the outer sheath 30.

In this manner, the resin 30a is inserted into a portion (portion in the state S2) of the overlapping portion 20c, at which the first end portion 20a and the second end portion 20b are adhered to each other with a film adhesive force smaller than the predetermined film adhesive force. Thus, the optical fiber cable 1A shown in FIG. 2 is produced.

When a portion (portion in the state S1) of the overlapping portions 20c at which the first end portion 20a and the second end portion 20b of the overlapping portions 20c are in close contact with each other without a gap, and are adhered to each other with a predetermined film adhesive force by the adhesive films 21 and 22, the resin 30a is not inserted into such a portion. That is, even though the resin pressure in the performing extrusion molding is uniform, there are a portion to which the resin 30a is inserted and a portion to which the resin 30a is not inserted, due to the difference in the adhesive state between the first end portion 20a and the second end portion 20b by the adhesive films 21 and 22.

Figure 7:
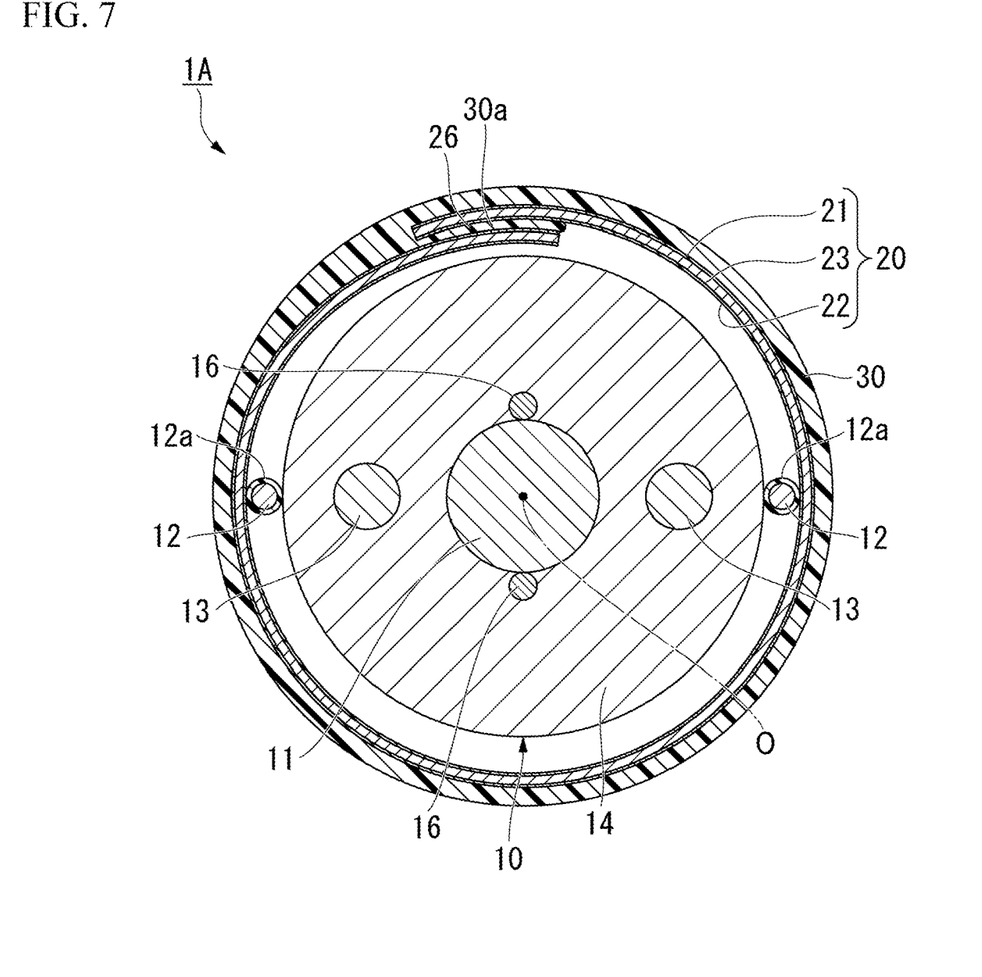
FIG. 7 is a cross-sectional view of the optical fiber cable according to the first embodiment.
Figure 8:
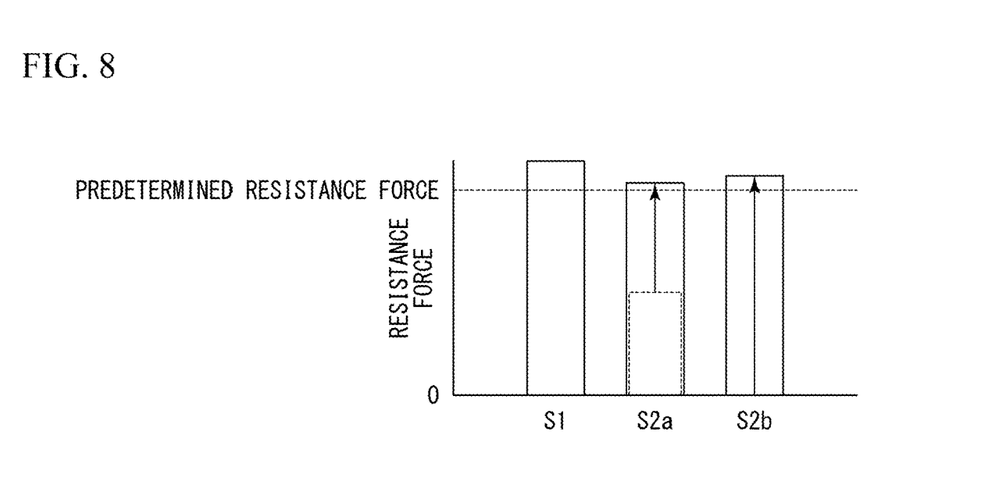
FIG. 8 is a diagram showing a resistance force of an optical fiber cable produced by the optical fiber cable production method according to the first embodiment.

Here, the effect obtained by the present embodiment will be described with reference to FIG. 8. FIG. 8 is a conceptual diagram showing the result of covering the reinforcing unit 20 with the resin pressure calculated in advance. In the present embodiment, by inserting the resin 30a into the gap 26, a suppressing force for suppressing the first end portion 20a by the outer sheath 30 is applied to the overlapping portion 20c in addition to the film adhesive force. Specifically, as shown in FIGS. 2 and 7, the outer sheath 30 provided on the outer peripheral side of the reinforcing unit 20 and the resin 30a inserted into the gap 26 are continuously formed. Thus, a force of the first end portion 20a toward the outer peripheral side of the optical fiber cable 1A when the optical fiber cable 1A is bent is suppressed. Therefore, in the present embodiment, the resistance force against the force for trying to open the overlapping portion 20c when the optical fiber cable 1A is bent is the sum of the film adhesive force by the adhesive films 21 and 22 and the suppressing force by the resin 30a.

A vertical axis in FIG. 8 indicates the resistance force, and a horizontal axis indicates the states S1, S2a, and S2b described above. In FIG. 8, a broken line indicates the film adhesive force before covering the outer sheath 30, and a solid line indicates the resistance force after covering the outer sheath 30 (that is, the sum of the film adhesive force and the suppressing force by the resin 30a). The "predetermined resistance force" in FIG. 8 refers to a threshold value of a force for suppressing an occurrence of a situation in which the overlapping portion 20c opens and the outer sheath 30 cracks when the optical fiber cable 1A is bent.

In the state S1, as indicated by the solid line in FIG. 8, the film adhesive force exceeds the predetermined resistance force. That is, in the state S1, the first end portion 20a and the second end portion 20b are sufficiently strongly adhered to each other by the film adhesive force of the adhesive films 21 and 22.

In the state S2b, the first end portion 20a and the second end portion 20b are not in contact with each other, and thus the film adhesive force is zero. Even though the first end portion 20a and the second end portion 20b are not in contact with each other, since the resin 30a of the outer sheath 30 is inserted into a gap between the first end portion 20a and the second end portion 20b, the suppressing force is applied to the overlapping portion 20c. As described above, by causing the resin 30a to exert the suppressing force, the resistance force at the portion of the state S2b is increased to the resistance force that is exceed the predetermined resistance force.

In the state S2a, since the first end portion 20a and the second end portion 20b are partially in contact with each other to form the gap 26, there is a film adhesive force smaller than the film adhesive force in the state S1 (broken line in FIG. 8). By inserting the resin 30a into the gap 26, the resin 30a inserted into the gap 26 exerts the suppressing force, and thus the resistance force at the portion of the state S2b is increased to the resistance force that is exceed the predetermined resistance force.

As described above, it is understood that, in all the states S1, S2a, and S2b, the resistance force in the overlapping portion 20c is increased to exceed the predetermined resistance force.

As described above, the production method of the optical fiber cable 1A in the present embodiment includes feeding the core 11 as the inner layer cable 10 including a plurality of optical fibers, winding the reinforcing unit (reinforcing member) 20 around the core 11 to form an overlapping portion 20c in which the end portions 20a and 20b of the reinforcing unit 20 overlap each other at a portion of the reinforcing member in the circumferential direction, and performing extrusion molding of an outer sheath (sheath) 30 on the outside of the reinforcing unit 20. Then, in the performing extrusion molding, the resin 30a forming the outer sheath 30 is inserted into at least a portion of the overlapping portion 20c.

According to such a production method, the suppressing force is applied by inserting the resin 30a forming the outer sheath 30 into the portion of the overlapping portion 20c in the state S2 which does not satisfy the predetermined film adhesive force, and thus it is possible to increase the resistance force of such a portion. Thus, since it is possible to increase the resistance of the overlapping portion 20c in the longitudinal direction to be equal to or higher than a predetermined resistance force, it is possible to suppress an occurrence of a phenomenon that the overlapping portion 20c opens when the optical fiber cable 1A is bent. Therefore, it is possible to suppress the occurrence of cracking in the outer sheath 30.

Further, the reinforcing unit 20 has a corrugated shape in which the peak portions 24 which are protrusions outward in the radial direction and the valley portions 25 which are protrusions inward in the radial direction are alternately formed along the longitudinal direction. In the overlapping portion 20c, the peak portions 24 are disposed to face each other in the radial direction, and the valley portions 25 are disposed to face each other in the radial direction. With this configuration, it is possible to easily bend the optical fiber cable 1A. Further, by forming the reinforcing unit 20 into a corrugated shape, it is possible to increase the contact area between the reinforcing unit 20 and the outer sheath 30. Thus, it is possible to increase the film adhesive force between the reinforcing unit 20 and the outer sheath 30.

In addition, the resin 30a forming the outer sheath 30 is formed of flame-retardant resin. In the case of this configuration, a filler having a relatively low melting point and softening temperature is added to the resin 30a. Thus, it may be a problem that the strength of the optical fiber cable 1A in a high temperature environment is lowered. In a general optical fiber cable, when the resin is flame-retardant resin, and the optical fiber cable is bent in a high temperature environment, the overlapping portion 20c opens and distortion (cracking) occurs. On the other hand, in the optical fiber cable 1A in the present embodiment, since the resin 30a forming the outer sheath 30 is inserted into the overlapping portion 20c of the reinforcing unit 20, it is possible to suppress a force for opening the overlapping portion 20c even in a high temperature environment. Thus, even if the resin 30a is a flame-retardant resin, it is possible to suppress the occurrence of cracking of the outer sheath 30.

In the first embodiment, the configuration in which the reinforcing unit 20 includes the first adhesive film 21 and the second adhesive film 22 has been described as an example. However, at least the first adhesive film 21 may be provided. Due to the absence of the second adhesive film 22, even if a portion having a low film adhesive force appears, since a suppressing force is applied to the portion having a weak film adhesive force by the resin 30a, the resistance force is increased. Therefore, it is possible to, for example, reduce the cost by omitting the second adhesive film 22.

Further, the description in which the entirety of the overlapping portion 20c and the tensile strength body 13 are disposed at different positions in the circumferential direction in the cross-sectional view. However, the entirety of the overlapping portion 20c and the tensile strength body 13 may be located at the same position in the circumferential direction.

Further, in the present embodiment, before the first end portion 20a and the second end portion 20b are adhered to each other with the resin 30a of the outer sheath 30, in the winding, the first end portion 20a and the second end portion 20b are temporarily fixed to each other by at least the first adhesive film 21. Even when the adhesive strength of the first adhesive film 21 is insufficient, the resin 30a is inserted into the portion having a weak film adhesive force. Thus, it is possible to increase the resistance force in the longitudinal direction to a predetermined resistance force or more. When temporarily fixing the first end portion 20a and the second end portion 20b, it is not necessary to provide the first adhesive film 21 on the entire surface of the reinforcing sheet 23. For example, an adhesive may be provided only on the overlapping portion 20c to temporarily fix the first end portion 20a and the second end portion 20b to each other.

Second Embodiment

Next, a second embodiment according to the present invention will be described. The basic configuration is the same as that in the first embodiment. Therefore, the same components are denoted by the same reference signs, the description thereof will be omitted, and only the different points will be described.

Figure 9:
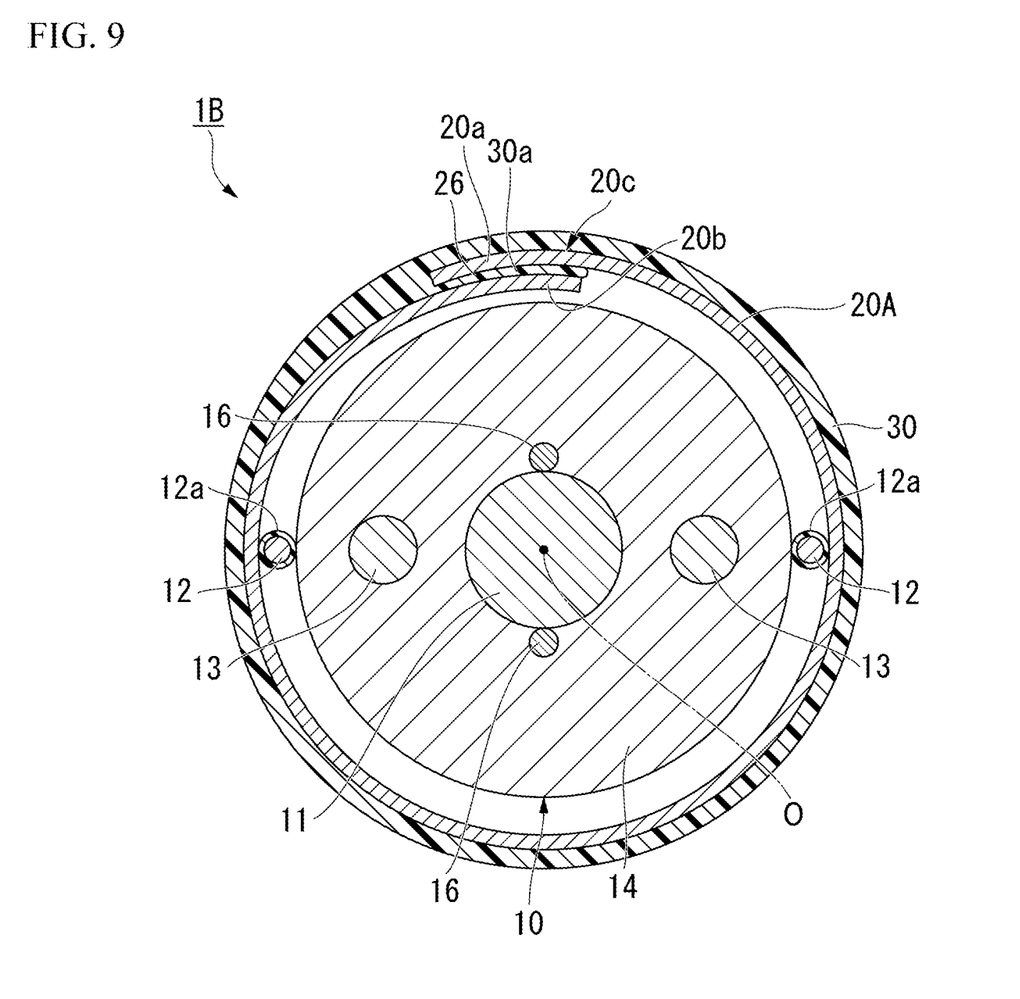
FIG. 9 is a cross-sectional view of an optical fiber cable according to a second embodiment.

As shown in FIG. 9, an optical fiber cable 1B in the present embodiment is different from the first embodiment in that a reinforcing unit 20A does not include the first adhesive film 21 and the second adhesive film 22. That is, the reinforcing unit (reinforcing member) 20A in the present embodiment corresponds to the reinforcing sheet 23 in the first embodiment.

Next, a production method of the optical fiber cable 1B in the present embodiment will be described.

In the present embodiment, the reinforcing unit 20A does not include the first adhesive film 21 and the second adhesive film 22. Thus, when the reinforcing unit 20A having peak portions 24 and valley portions 25 is wound around the inner layer cable 10, the overlapping portion 20c is fixed or not temporarily fixed. The reinforcing unit 20A has a cylindrical shape that surrounds the inner layer cable 10 and extend in the longitudinal direction.

Figure 10:
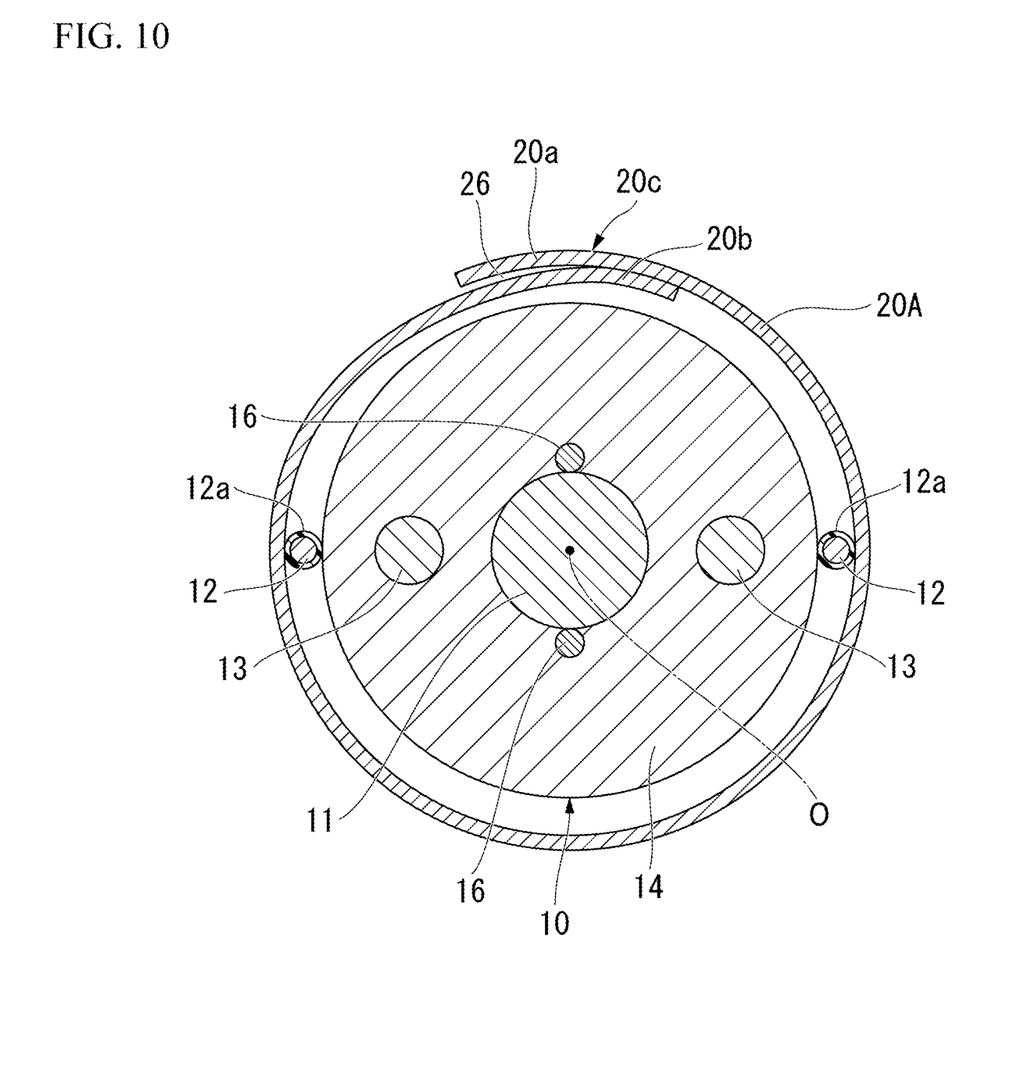
FIG. 10 is a cross-sectional view before covering an outer sheath of the optical fiber cable according to the second embodiment.
Figure 11:
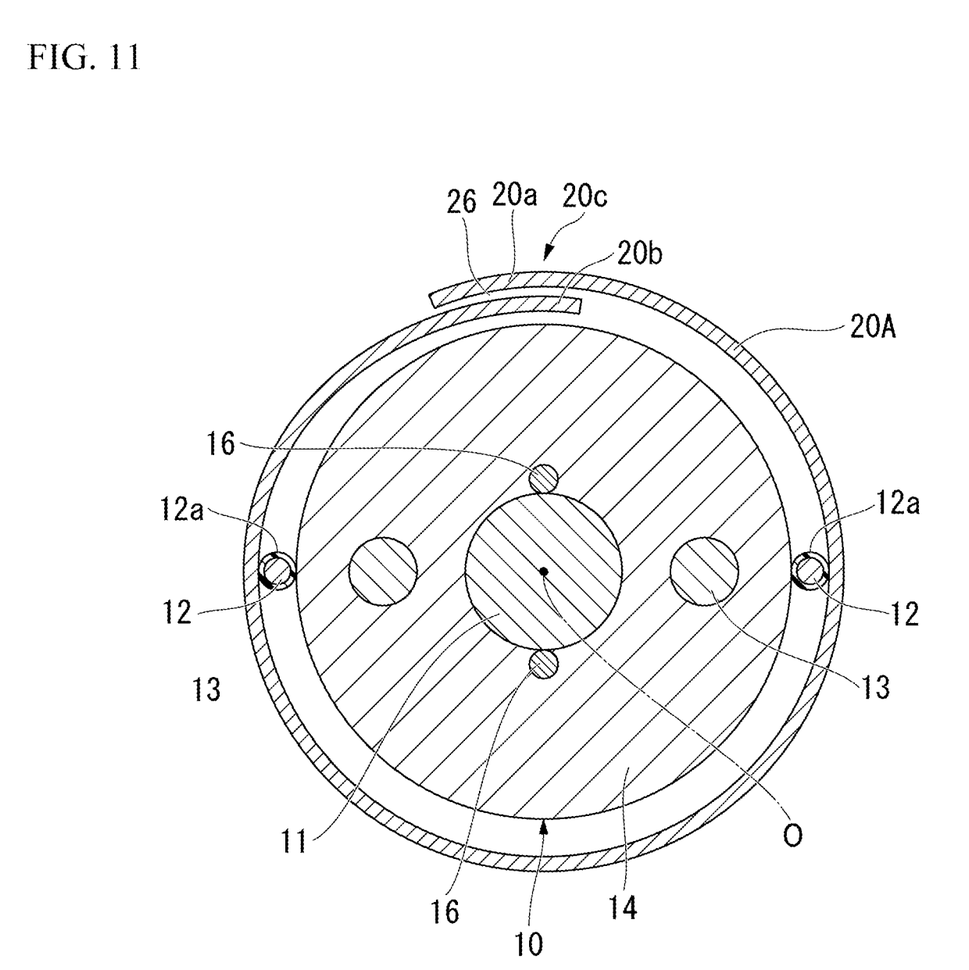
FIG. 11 is a cross-sectional view before covering the outer sheath of the optical fiber cable according to the second embodiment.

At this time, in the cross-sectional view, the overlapping portion 20c of the reinforcing unit 20A may have a state S3a (not shown) in which the first end portion 20a and the second end portion 20b are in close contact with each other without a gap, a state S3b in which the first end portion 20a and the second end portion 20b are partially in contact with each other to form a gap 26 as shown in FIG. 10, and a state S3c in which the gap 26 is formed without the first end portion 20a and the second end portion 20b being in contact with each other, as shown in FIG. 11.

Then, the outer sheath 30 is extrusion-molded by using an extrusion covering device 40 as in the first embodiment so as to cover the reinforcing unit 20A.

At this time, the relationship between the resin pressure and the adhesive strength is obtained in advance, and the distance N is calculated so that the value of W1/W2 is equal to or more than 0.10 as in the first embodiment.

The reinforcing unit 20A is coated with the resin 30a in a state where the nipple 41 and the die 42 are installed so that the distance between the nipple 41 and the die 42 is N. In order to keep the outer diameter dimension of the outer sheath 30 uniform along the longitudinal direction, the resin pressure is kept substantially uniform. Thus, the resin 30a is evenly inserted into the overlapping portion 20c in the longitudinal direction. In this manner, the resin 30a is inserted into the gap 26 in the state S3b shown in FIG. 10, and the resin 30a is inserted into the gap 26 in the state S3c shown in FIG. 11. Further, the overlapping portion 20c in the above-described state S3a is also expanded between the first end portion 20a and the second end portion 20b by the resin pressure, and the resin 30a is inserted into the gap. As described above, in any of the states, as shown in FIG. 9, the outer sheath 30 in which the resin 30a is inserted is formed in the overlapping portion 20c, and the optical fiber cable 1B is produced.

In the present embodiment, since the reinforcing unit 20A does not include the first adhesive film 21 and the second adhesive film 22, the suppressing force of the first end portion 20a by the outer sheath 30 becomes a resistance force against the force for trying to open the overlapping portion 20c when the optical fiber cable 1A is bent. In the optical fiber cable 1B as well, similar to the optical fiber cable 1A in the first embodiment, in any of the states S3a, S3b, and S3c, the resistance force is increased to be equal to or higher than a predetermined resistance force.

As described above, also in the production method of the optical fiber cable 1B in the present embodiment includes feeding the core 11 including a plurality of optical fibers, winding the reinforcing unit (reinforcing member) 20A around the core 11 to form an overlapping portion 20c in which the end portions 20a and 20b of the reinforcing unit 20A overlap each other at a portion of the reinforcing member in the circumferential direction, and performing extrusion molding of an outer sheath (sheath) 30 on the outside of the reinforcing unit 20A. Then, in the performing extrusion molding, the resin 30a forming the outer sheath 30 is inserted into the overlapping portion 20c. Thus, similar to the first embodiment, since it is possible to increase the resistance of the overlapping portion 20c in the longitudinal direction to be equal to or higher than a predetermined resistance force, it is possible to suppress an occurrence of a phenomenon that the overlapping portion 20c opens when the optical fiber cable 1B is bent. Therefore, it is possible to suppress the occurrence of cracking in the outer sheath 30.

EXAMPLES

The above embodiments will be described below by using specific examples. The present invention is not limited to examples as follows.

The optical fiber cable 1A produced by using the production method according to the first embodiment described above was evaluated.

The outer diameter of the inner layer cable 10 is 14.6 mm, the length of the reinforcing unit 20 in the circumferential direction is 64 mm, the width W2 of the overlapping portion 20c of the reinforcing unit 20 in the circumferential direction is 10 mm, and the outer diameter of the optical fiber cable 1A is 22.1 mm. EVA was used as the material of the outer sheath 30. As a flame retardant, for example, a filler such as a metal hydroxide (aluminum hydroxide or magnesium hydroxide) or a phosphorus-based flame retardant is added. In order to add the filler such as a flame retardant, base resin containing soft EVA, EEA (ethylene ethyl acrylate copolymer), and an elastomer having a relatively low melting point and softening temperature can be used.

Under the above conditions, a plurality of samples in which the values of W1/W2 were changed by changing the distance between the nipple 41 and the die 42 when the outer sheath 30 was extrusion-molded were prepared. After each sample was left at 70° C. for 3 days, the presence or absence of cracks in the outer sheath 30 at a bending diameter φ40D (D: outer diameter of the optical fiber cable 1A) and φ30D was examined. The above bending diameter was adopted based on the standards of various optical fiber cables. Further, the condition of leaving at 70° C. for 3 days was set as a condition for allowing confirming the reliability of the outer sheath 30 based on an empirical rule.

Table 1 shows the test results.

TABLE 1

| Width W1 (mm) of resin inserted into overlapping portion | Width W2 (mm) of overlapping portion | W1/W2 | φ40D | φ30D |
|---|---|---|---|---|
| | | | Cracking of outer sheath | |
| 0 | 10 | 0 | Y | Y |
| 0.8 | 10 | 0.08 | N | Y |
| 1.0 | 10 | 0.10 | N | N |
| 1.5 | 10 | 0.15 | N | N |
| 2.3 | 10 | 0.23 | N | N |

As can be understood from Table 1, when the ratio (W1/W2) of the width W1 of the resin 30a inserted into the overlapping portion 20c to the width W2 of the overlapping portion 20c is equal to or more than 0.10, the outer sheath 30 was not cracked with any of the bending diameters φ40D and φ30D. Therefore, it was understood that, by setting the value of W1/W2 to be equal to or more than 0.10, it was possible to more reliably suppress the occurrence of cracking of the outer sheath 30.

Based on this result, the resin pressure in the performing extrusion molding may be pressure obtained in advance so as to satisfy W1/W2>0.10.

The technical scope of the present invention is not limited to the above-described embodiments, and various modifications can be made without departing from the spirit of the present invention.

For example, in the production method in the first embodiment, the reinforcing unit 20 has been described as having the states S1, S2a, and S2b. However, it is not necessary to include all of these states. That is, it is possible to obtain effects as follows. If the reinforcing unit 20 includes at least one of the states S2a and S2b, it is possible to suppress the occurrence of the cracking of the outer sheath 30. In addition, the suppressing force is applied in the portion where the film adhesive force is weak in the longitudinal direction, and the resistance force is increased. Thus, it is possible to improve the reliability of the optical fiber cable 1A. Similarly, also in the production method in the second embodiment, the reinforcing unit 20A does not have to include all the states of the state S3a, the state S3b, and the state S3c, and may include at least one of the states S3a, S3b, and S3c.

Further, in the reinforcing units 20 and 20A in the above embodiments, the configuration in which the peak portions 24 and the valley portions 25 are alternately formed along the longitudinal direction has been described as an example. However, the reinforcing unit 20 may not be corrugated. Further, the corrugated shape of the reinforcing unit 20 is not limited to the above-described configuration. For example, the corrugated shape may have a configuration in which the peak portions 24 and the valley portions 25 extending obliquely with respect to the longitudinal direction are alternately formed in the longitudinal direction.

In the optical fiber cables in the first and second embodiments, the reinforcing unit 20 is configured to surround the inner layer cable 10. However, the present invention is not limited to this, and the reinforcing unit 20 may surround the core 11. In the case of this configuration, in the first and second embodiments, only the core 11 may be fed out instead of the inner layer cable 10, and the reinforcing unit 20 may be wound around the core 11 in the winding.

Further, in the production method in the first and second embodiments, the winding is performed after forming the peak portion 24 and the valley portion 25 of the reinforcing unit 20 (20A). However, the peak portion 24 and the valley portion 25 may be formed before the performing extrusion molding after the winding is performed by using the flat sheet-shaped reinforcing unit 20 (20A).

Further, in the first and second embodiments, the dimension M2 of the resin 30a between the valley portion 25a and the valley portion 25b in the radial direction is thicker than the dimension M1 of the resin 30a between the peak portion 24a and the peak portion 24b in the radial direction. However, the present invention is not limited to this. That is, a configuration in which the dimension M2 is thinner than the dimension M1 or a configuration in which the thickness of the resin 30a is uniform between the peak portions 24 and between the valley portions 25.

Further, the resin 30a may be inserted into at least a gap between the valley portion 25a and the valley portion 25b between the first end portion 20a and the second end portion 20b of the overlapping portion 20c.

Further, the inner layer cable 10 is not limited to the above-described configuration, and may be a loose tube, a wrapping tube cable (WTC), or a slot type. Further, a tensile strength body may be buried in the outer sheath 30. Further, the plurality of optical fibers and the inner layer cable 10 may or may not be covered with a presser roll or a water absorbing tape (sheet), if necessary. Further, the present invention is not limited to the water absorbing tape (sheet), other waterproofing material or water absorbing material may or may not be provided as needed.

Further, in each of the above embodiments, the cross-sectional shape of the core 11 is circular. However, the cross-sectional shape of the core 11 may be elliptical or rectangular.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1A, 1B: Optical fiber cable
11: Core
12: First ripcord
20, 20A: Reinforcing unit (reinforcing member)
20c: Overlapping portion
21: First adhesive film (adhesive layer)
24: Peak portion
25: Valley portion
30: Outer sheath (sheath)
30a: Resin

What is claimed is:

1. An optical fiber cable comprising:
a core comprising optical fibers;
a reinforcing wrap that surrounds the core; and
a sheath that accommodates the core and the reinforcing wrap, wherein
the reinforcing wrap comprises an overlapping portion,
a first end portion of the reinforcing wrap overlaps a second end portion of the reinforcing wrap at a portion of the reinforcing wrap in a circumferential direction of the optical fiber cable in a cross-sectional view,
the overlapping portion:
extends in a longitudinal direction of the optical fibers, and comprises:
a first longitudinal portion in which:
the first end portion and the second end portion are partially in contact with each other, and
a partial-width gap extends over only a part of the first longitudinal portion in the circumferential direction; and
a second longitudinal portion in which the first end portion and the second end portion are in contact with each other without a gap, and
a resin that forms the sheath is inserted into the partial-width gap.

2. The optical fiber cable according to claim 1, wherein the reinforcing wrap has a corrugated shape that comprises:
peak portions that protrude outward in a radial direction of the optical fiber cable; and
valley portions that protrude inward in the radial direction,
the peak portions and the valley portions are alternately disposed along the longitudinal direction, and
in the overlapping portion,
the peak portions are disposed to face each other in the radial direction, and
the valley portions are disposed to face each other in the radial direction.

3. The optical fiber cable according to claim 2, wherein the resin is inserted into a gap between the valley portions of the overlapping portion.

4. The optical fiber cable according to claim 1, wherein the sheath is made of a flame-retardant resin.

5. The optical fiber cable according to claim 1, wherein $W1/W2 \geq 0.10$, where
- W2 is a width of the overlapping portion in the circumferential direction, and
- W1 is a width of the resin inserted into the overlapping portion in the circumferential direction.

6. The optical fiber cable according to claim 1, further comprising:
- a ripcord disposed between the core and the reinforcing wrap, wherein
- the ripcord is disposed at a position different from a position of the overlapping portion in the circumferential direction.

7. The optical fiber cable according to claim 1, wherein the reinforcing wrap further comprises a first adhesive layer on a first surface of the reinforcing wrap that faces the sheath.

8. The optical fiber cable according to claim 7, wherein the reinforcing wrap further comprises a second adhesive layer on a second surface of the reinforcing wrap that faces inward in a radial direction of the reinforcing wrap.

9. An optical fiber cable production method comprising:
feeding a core comprising optical fibers;
winding a reinforcing wrap around the core and forming an overlapping portion that extends in a longitudinal direction of the optical fibers and in which a first end portion of the reinforcing wrap overlaps a second end portion of the reinforcing wrap at a portion of the reinforcing wrap in a circumferential direction of a optical fiber cable; and
performing extrusion molding of a sheath on an outside of the reinforcing wrap, wherein, the overlapping portion comprises:
- a first longitudinal portion in which:
  - the first end portion and the second end portion are partially in contact with each other, and
  - a partial-width gap extends over only a part of the first longitudinal portion in the circumferential direction; and
- a second longitudinal portion in which the first end portion and the second end portion are in contact with each other without a gap, and
the performing extrusion molding comprises inserting a resin that forms the sheath into the partial-width gap.

* * * * *